United States Patent [19]

Nishino

[11] Patent Number: 4,775,186
[45] Date of Patent: Oct. 4, 1988

[54] RECLINING DEVICE MOUNTING STRUCTURE IN AUTOMOTIVE SEAT

[75] Inventor: Takaichi Nishino, Akishima, Japan

[73] Assignee: Tachi-S Co., Ltd., Akishima, Japan

[21] Appl. No.: 67,637

[22] Filed: Jun. 26, 1987

[51] Int. Cl.⁴ ............................................. B60N 1/02
[52] U.S. Cl. .................................... 297/367; 248/429
[58] Field of Search ............... 248/429, 430, 393, 903; 403/190, 335, 337, 403, 363; 297/366, 367, 355, 443; 5/37 R, 38

[56] References Cited

U.S. PATENT DOCUMENTS

| | | | |
|---|---|---|---|
| 2,612,211 | 9/1952 | Gielow et al. | 297/443 X |
| 3,408,665 | 11/1968 | Harris | 403/363 X |
| 3,926,474 | 12/1975 | Johndrow | 297/355 |
| 4,372,609 | 2/1983 | Boisset | 297/355 X |
| 4,455,048 | 6/1984 | Bassi | 297/367 |

Primary Examiner—James T. McCall
Attorney, Agent, or Firm—Oldham & Oldham Co.

[57] ABSTRACT

A reclining device mounting structure in an automotive seat, in which a lower bracket of the reclining device is mounted on an upper rail of a sliderail adapted for fore-and-aft adjustment of the seat. More particularly, disclosed is this kind of structure in which the lower bracket of the reclining device is mounted on an mounting portion in the rearward region of an upwardly raised portion formed in the upper rail. The mounting portion is therefore located above the lower rail of the slide rail and in the rearward portion of a seat back of the seat, thus making it easier the mounting of the reclining device on the upper rail.

4 Claims, 1 Drawing Sheet

RECLINING DEVICE MOUNTING STRUCTURE IN AUTOMOTIVE SEAT

BACKGROUND OF THE INVENTION

1. Field of the Invention

The present invention relates to the structure of an automotive seat wherein a reclining device is mounted, and more particularly to the structure of seat cushion side of the seat in which a lower bracket of a reclining device is mounted.

2. Description of the Prior Art

In order for an occupant on an automotive seat to take a comfortable sitting posture according to his or her physique or sitting preference, a reclining device is provided between the seat back and seat cushion of the seat so that the occupant can adjust the inclination of the seat back relative to the seat cushion to an optimum degree for comfortable sitting posture.

Hitherto, as shown in FIG. 1, it has been a common manner that this kind of reclining device is interposed between a seat back frame (2) and a seat cushion frame (3). The reclining device comprises a lower bracket (4), an upper bracket (5), both of them being pivotally fixed in a rotatable manner, a locking mechanism (4a), and an unlocking mechanism (7). Operation of those locking and unlocking mechanisms permits selective angular adjustments of the seat back frame (2) with respect to the cushion frame (3).

In FIG. 1, reference character (4c) denotes an elongated hole into which a pin (not shown) of the unlocking mechanism (7) is inserted.

However, in this prior art, the reclining device (1) is at its lower bracket (4) fixedly secured to the outer lateral surface of the seat cushion frame (3) by means of bolts (4b). In particular, prior to such mounting of the reclining device (1) on the seat cushion frame (3), there is a troublesome step to remove a top cover layer and foam cushion member stretched over the seat cushion frame (3) in order that the lower bracket (4) of the reclining device (1) can be directly mounted on the lateral surface of the seat cushion frame (3).

SUMMARY OF THE INVENTION

With a view to eliminating the above-mentioned drawback of conventional structure, it is a primary purpose of the present invention to provide a reclining device mounting structure in an automotive seat which permits easy mounting of a lower bracket of the reclining device on a seat cushion frame.

To attain the above purpose, the present invention is of such structure that there is formed an upwardly raised portion in an upper rail of a slide rail installed under a seat cushion frame for the fore-and-aft adjustment of the seat, and the upwardly raised portion has a mounting portion formed in it rearward region, which mounting portion is adapted for mounting of the lower bracket of the reclining device thereon.

Accordingly, when the lower bracket of the reclining device is placed in the mounting portion of the upwardly raised portion, then it is possible to easily ascertain a correct position for fixing the lower bracket to the upper rail, whereby the lower bracket is easily fixed to the upper rail by means of bolts or other fixing means. Moreover, the upwardly raised portion of the upper rail is not covered with any top cover layer and cushion member but exposed exteriorly, which allows direct, easy mounting of the lower bracket of the reclining device on the upwardly raised portion, without any special step.

It is a second purpose of the present to provide a reclining device structure in an automotive seat which is highly reinforced in rigidity.

To this end, in the foregoing upwardly raised portion of the upper rail, there are formed an upper flange and a lower flange at its respective upper and lower ends, and further, formed is a stepped portion between the upper and lower flanges. In addition thereto, in the present invention, the lower bracket is formed with a flange in its portion to be fitted to the mounting portion of the upwardly raised portion. Hence, the upper and lower flanges of the upwardly raised portion are juxtaposed with the flange of the lower bracket, and therefore the lower bracket is more fixedly mounted on the upper rail, which also obviates the possibility that the fixing means for fixing those upwardly raised portion and lower bracket will be loosened.

DETAILED DESCRIPTION OF PREFERRED EMBODIMENT OF THE INVENTION

Figure 1:
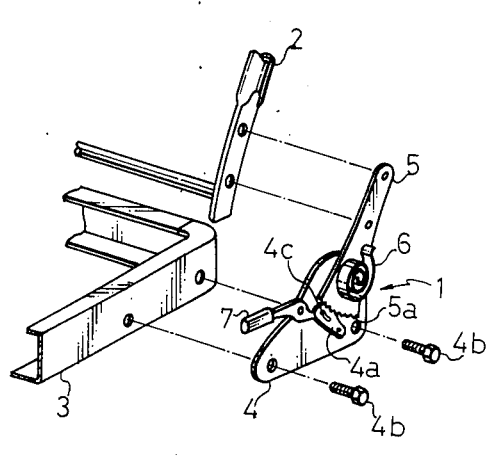
FIG. 1 is an exploded perspective view of a conventional structure for mounting a reclining device.
Figure 2:
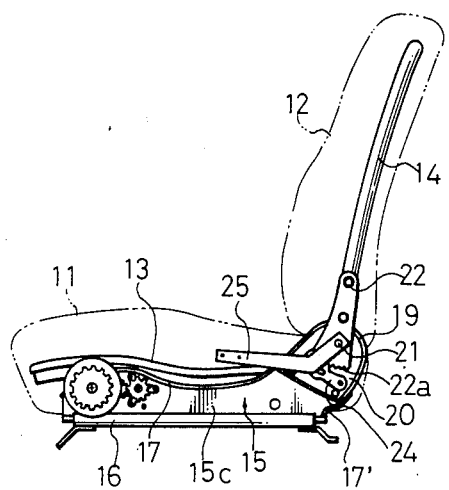
FIG. 2 is a side view of an automotive seat in which the present invention is applied.

Referring to FIG. 2, there is illustrated an automotive seat provided with a reclining device in which a seat back (12) is inclinably connected to a seat cushion (11) by means of the reclining device.

Figure 4:
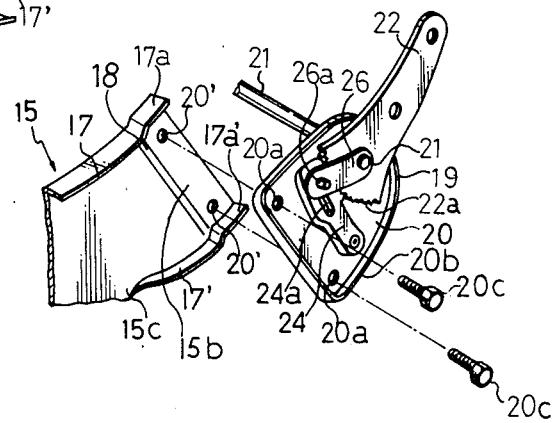
FIG. 4 is an exploded perspective view of the principal part as shown in the FIG. 3.

The reclining device in the present embodiment comprises an upper bracket (22) fixed by bolts (20c) to a seat back frame (14), a lower bracket (20), a shaft (21) to which the upper and lower brackets (22)(20) are journalled rotatably, a gear (22a) which limits the rotation range of the upper bracket (22), a stopper (24) normally intermeshed with the gear (22a) to place the seat back frame (14) in a locked state with respect to ta seat cushion frame (13), an operation lever so arranged to disengage the stopper (24) from the gear (22a) when so operated to release the locked state of the seat back frame (14), and a link (26). In this connection, as shown in FIG. 4, the stopper (24) is formed with an elongated hole (24a) into which inserted is a pin (26a) of the link (26), whereby the operation of the lever (25) causes the pin (26a) to move in the elongated hole (24a), which then causes the rotation of the stopper (24) away from the gear (22a) for the unlocking purpose. Although not shown, thus-constructed reclining device is also provided at the other opposite side of the slide rail, and thus a pair of such reclining device are provided on the right and left sides of the slide rail in an interlocking relation.

The slide rail is comprised of an upper rail (15) and a lower rail (16), both of them being slidably fitted together. The lower rail (16) is fixed to the floor of an automobile. The upper rail (15) is at it lower portion bent into a J-shaped configuration and engaged with the lower rail (16) so that the upper rail (15) is prevented from being removed out of the lower rail (16).

The upper rail (15) is so formed that it extends vertically relative to the lower rail (16), and has at its upper end a flange (17) which is formed by being bent therefrom outwardly, so as to reinforce the rigidity of the upper rail (15). In the rearward portion of the upper rail (15), which is not engaged with the lower rail (16), formed also is a flange (17') in an outwardly projected manner, to thereby reiforce the rigidity of the rearward portion of the upper rail (15).

To such rearward portion of the upper rail (15), is fixed the lower bracket (20) of the above-described reclining device by means of the bolts (20c).

The upper bracket (22) of the same reclining device is fixed to the seat back frame (14) by means of a bolt and further pivotally fixed in the lower bracket (20) by means of the shaft (21) so that the upper bracket (22) is rotatable relative to the lower bracket (20). The shaft (21) extends between the right and left bar sections of the substantially U-shaped seat back frame (14). The operation lever (25) is at its one end fixed to the shaft (21) so that the shaft (21) is rotated by operation of the lever (25). The lower portion of the illustrated upper bracket (22) is formed in a sector-like shape and has the gear (22a) defined in its lower end. To this gear (22a), is intermeshed the stopper (24) provided in the lower bracket (20), to thereby normally place the seat back frame (14) in a locked state at a given angle of inclination relative to the seat cushion frame (13).

The slide rail comprises a pair of right and left slide rails, and the seat cushion frame (13) is disposed inwardly of the right and left slide rails. The seat cushion frame (13) is so arranged as to be vertically movable by means of a linkage (not shown) and gears provided on the upper rail (15) and seat cushion frame (13).

Figure 3:
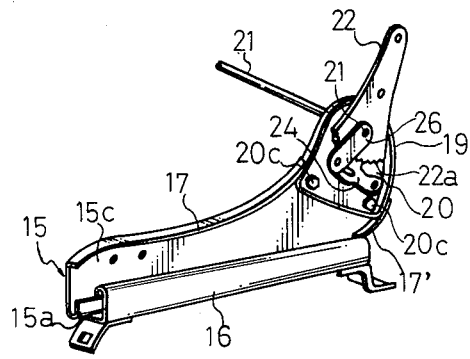
FIG. 3 is a perspective view showing a principal part of the present invention applied in the same reclining device as in the FIG. 2.

FIG. 3 shows the above-mentioned reclining device mounted on the above-mentioned slide rail, except for the operation lever (25). To provide this structure, the seat cushion frame (13) with seat cushion (11) is firstly mounted on the slide rail and then the reclining device is mounted on the upper rail (15) of the slide rail.

The upper rail (15) comprises an upwardly raised portion (15c) extending up vertically from its portion engaged with the lower rail (16), and a mounting portion (15b) which integrally extends from the rearward portion of the upwardly raised portion (15c).

The upper end of the upwardly raised portion (15c) is formed in a curved shape conforming to the contour of the upper surface of the seat cushion (11) and the flange (17) is formed by bending such upper end at a right angle relative to the upwardly raised portion (15c), for the purpose of reinforcing the rigidity of the upwardly raised portion (15c) per se.

To this upwardly raised portion (15c), mounted in the seat cushion frame (13) in a vertically movable manner by means of a seat lifter mechanism (not shown).

Referring now to FIG. 4, the mounting portion (15b) is integrally formed in the rearward region of the upwardly raised portion (15c), extending in an upward direction, and has an upper flange (17a) in its upper end, which upper flange (17a) extends integrally, continuously from the upper flange (17) of the upwardly raised portion (15c), as well as a lower flange (17a') in its lower end, which lower flange (17a') likewise extends integrally, continuously from the lower flange (17') of the upwardly raised portion (15c). Between those upper and lower flanges (17a)(17a'), there is formed a stepped portion (18) which extends in a height-wise direction of the upwardly raised portion (15c). Accordingly, all of the upper flange (17a), lower flange (17a') and stepped portion (18) cooperates to reinforce the rigidity of the mounting portion (15b).

In this figure, designations (20') denote holes perforated in the mounting portion (15b) which are adapted for receiving the bolts (20c) to secure the the lower bracket (20) to the mounting portion (15b).

The lower bracket (20) is so formed that its lower portion is fitted in place within the mounting portion (15b), and is further provided at its peripheral end with a flange (19) which is bent at a right angle from the lower bracket (20) to reinforce the rigidity of the lower bracket (20). The flange (19) has a part (20b) to be fitted in the mounting portion (15b), and such part (20b) is formed in such dimensions as to closely contact the inner walls of of the upper and lower flanges (17a)(17a') of the mounting portion (15b). In the lower bracket (20), there are formed holes (20a) in alignment with the respective holes (20') of the mounting portion (15b). Accordingly, the lower bracket (20) with the upper bracket (22) and other parts arranged therein is fitted in the mounting portion (15c) and secured fixedly thereto by virtue of the bolts (20c) being inserted though the holes (20a)(20'). In this context, care must be taken that the upper bracket (22) is firstly fixed to the seat back frame (14) and thereafter, the lower bracket (20) is fixed to the upper rail (15).

The reclining device described above is not limited to the present embodiment, but it may be comprised of a pair of right and left reclining devices and the mounting portion (15b) may also be comprised of a pair of right and left mounting portions in such an arrangement that the right reclining device and mounting portions are disposed at the upper rail of the right slide rail while on the other hand the left reclining device and mounting portions are disposed at the upper rail of the left slide rail.

Form the above description, it is to be appreciated that the upper rail of the slide rail has the mounting portion formed therein, in which mounted is the lower bracket of the reclining device in a closely fitting manner, and therefore, the fixing points of those mounting portion and reclining device can be brought in alignment with each other, thereby facilitating easy and precise mounting of the reclining device on the upper rail. Further, the provision of flanges in both upper rail and lower bracket is so effective that the flange of the lower bracket is juxtaposed closely with the inner surfaces of the flange of the upper rail, which ensures a positive and firm mounting of the lower bracket on the upper rail. Still further, the mounting portion of the upper rail is greatly reinforced its rigidity by virtue of the upper and lower flanges as well as the stepped portion formed therein, and as such, even when applied a great load, the reclining device is not deformed due to such three cooperative reinforcing elements.

The description above has just been given of preferred embodiments of the present invention, but it should be understood that the invention is not limited to the embodiments illustrated but various other replacements, modifications and additions may structurally be possible without departing from the scope and spirit of the appended claims for the invention.

What is claimed is:

1. A reclining device mounting structure in an automotive seat having a seat cushion and a seat back, comprising:

a slide rail adapted for foreward and backward adjustment of said seat cushion, said slide rail including a lower rail to be fixed to a floor of an automobile and an upper rail slidably fitted to said lower rail;

a reclining device connected with said upper rail and a seat back frame of said seat back, said reclining device being adapted to adjust the angle of inclination of said seat back with respect to said seat cushion;

an upwardly raised portion formed in said upper rail of said slide rail such that it extends upwardly therefrom and is disposed above said lower rail;

a mounting portion integrally extending from a rearward region of said upwardly raised portion, said mounting portion being adapted for mounting said reclining device thereon;

a lower bracket mounted on said mounting portion of said upper rail, to which said lower bracket is pivotally fixed said reclining device in a rotatable manner; and said mounting portion of said upper rail including upper and lower flanges and a stepped portion formed between said upper and lower flanges, wherein said lower bracket is partially fitted in said mounting portion.

2. The reclining device mounting structure as defined in claim 1, wherein said lower bracket of said reclining device is provided with a flange in its peripheral end at a point where said lower bracket is mounted in said mounting portion of said upper rail, and wherein said flange of said lower bracket is closely contacted with inner walls of said upper and lower flanges of said mounting portion, to thereby increase a rigidity of said lower bracket.

3. The reclining device mounting structure as defined in claim 1, wherein said slide rail comprises a pair of right and left slide rails, and wherein between two upper rails of said right and left slide rails, provided is said seat cushion frame in such a manner as to be vertically movable by means of a seat lifter mechanism.

4. The reclining device mounting structure as defined in claim 1, wherein at least one hole is formed in each of said mounting portion of said upper rail and said lower bracket of said reclining device, such that the hole of said mounting portion is aligned with the hole of said lower bracket, whereby a bolt is inserted through said aligned holes so as to fixedly secure said lower bracket to said mounting portion.

* * * * *